(12) United States Patent
Zackrisson et al.

(10) Patent No.: US 7,260,193 B2
(45) Date of Patent: Aug. 21, 2007

(54) METHOD AND SYSTEM OF RATING IN A CHARGING SYSTEM

(75) Inventors: Peter Zackrisson, Kariskrona (SE); Johan Häggman, Rödeby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 101 days.

(21) Appl. No.: 10/512,836

(22) PCT Filed: Apr. 30, 2003

(86) PCT No.: PCT/SE03/00707

§ 371 (c)(1),
(2), (4) Date: Jan. 27, 2005

(87) PCT Pub. No.: WO03/094494

PCT Pub. Date: Nov. 13, 2003

(65) Prior Publication Data

US 2005/0136889 A1    Jun. 23, 2005

(30) Foreign Application Priority Data

Apr. 30, 2002  (SE) .................. 0201315

(51) Int. Cl.
*H04M 11/00* (2006.01)
*H04M 15/00* (2006.01)

(52) U.S. Cl. .............. 379/114.28; 379/114.06; 379/121.03; 379/127.04; 455/406; 455/407; 455/408

(58) Field of Classification Search ......... 379/114.01, 379/114.03, 114.06, 114.1, 114.12, 114.28, 379/121.02, 121.06, 122, 127.03–127.04, 379/127.06, 121.03; 455/406–408
See application file for complete search history.

(56) References Cited

U.S. PATENT DOCUMENTS

| | | | |
|---|---|---|---|
| 5,943,320 A | | 8/1999 | Weik et al. |
| 6,018,652 A | * | 1/2000 | Frager et al. ............ 455/406 |
| 6,195,543 B1 | * | 2/2001 | Granberg ............ 455/407 |
| 6,263,058 B1 | | 7/2001 | Lautenschlager et al. |
| 6,324,404 B1 | * | 11/2001 | Dennison et al. ....... 455/456.1 |

(Continued)

FOREIGN PATENT DOCUMENTS

EP    0452591 A2    10/1991

(Continued)

*Primary Examiner*—Binh K. Tieu
(74) *Attorney, Agent, or Firm*—Nixon & Vanderhye P.C.

(57) ABSTRACT

A method and system for determining rating data for services in a communication network, wherein an incoming charging request is received from a service element (105, 106), data such as a location number associated with a service or a subscriber (102) is accessed, and a tariff structure is traversed (307). It is determining whether there is a branching condition for the data and then if any list or record (201a,b; 202a,b; 203a,b; 204a,b) is associated with a subscriber (201), account (203), subscriber group (202), or account group (204) contains the data (309, 310). A list indicator corresponding to the data is accessed (311). It is determined whether there is a branching condition for the list indicator (312), and if so the list indicator is searched in the tariff structure (313). Analyse of the tariff structure is performed based on the list indicator for finding a resulting tariff for return to the request (314-320).

19 Claims, 6 Drawing Sheets

U.S. PATENT DOCUMENTS 6,345,182 B1 * 2/2002 Fabritius et al. ............ 455/408
6,553,217 B1 * 4/2003 Kundorf ..................... 455/406
6,804,505 B1 * 10/2004 Nilsson et al. ............. 455/406
6,865,262 B1 * 3/2005 Mitts et al. ............ 379/114.02
2002/0098827 A1 * 7/2002 Nilsson ..................... 455/406
2003/0040297 A1 * 2/2003 Pecen et al. ................ 455/406

FOREIGN PATENT DOCUMENTS

WO          0016579 A1    3/2000

* cited by examiner

METHOD AND SYSTEM OF RATING IN A CHARGING SYSTEM

This application is the US national phase of international application PCT/SE03/00707, filed in English on 30 Apr. 2003, which designated the US. PCT/SE03/00707 claims priority to SE Application No. 0201315-9 filed 30 Apr. 2002. The entire contents of these applications are incorporated herein by reference.

FIELD OF THE INVENTION

The present invention relates to a method and system for flexible rating differentiation of service usage in a communications system depending on data unique per subscriber, account or groups of subscribers and accounts.

DESCRIPTION OF THE PRIOR ART

All commercial communications networks, for example mobile telephone communications networks including operators and service providers, have a charging system for charging customers utilising the network and different services.

Today's mobile telephone communications networks such as GSM, public switched telecommunications networks (PSTN), ISDN, ATM, Internet etc. provide many different more or less sophisticated tele and data communications services for users and providers, regional as well as worldwide. The demands for increased benefit of the network operator, the service provider, and the service subscriber have brought forth the concept of Intelligent Network (IN). An Intelligent Network is a telecommunications concept that meets the market demand, from network operators and service providers, for advanced services within the existing telephony network. Examples of such services are Premium Rate calls, Mobile Virtual Private Network, Prepaid charging and Personal Number. Different network providers offer different sets of services including both charged services and services free of charge.

Charging for usage of mobile telephone communications networks such as GSM, public switched telecommunications networks (PSTN), ISDN, ATM, Internet etc. and their associated services are achieved by means of a payment mechanism or service. Both postpaid and prepaid services are used. On one hand, the service subscriber pays for a service after it has been used, for example once a month, in postpaid service. Contrary, in a prepaid service, the service subscriber or customer pays before the usage of the service.

In some charging systems there is a need for making flexible rating differentiation depending on data unique per subscriber, account or groups of subscribers and accounts.

In prior art systems the charge rate is based on number lists. It is common for these systems that the lists are common for a certain group of subscribers or group of accounts. Examples of such lists are so called black lists, which includes numbers not allowed to call. Another example is always free call, which holds a numbers that are always free to call. One example for a number in such a list is a number to customer service.

Since these lists tied to a group of subscribers or group of accounts were not adequate for mobile operators, when it came to providing subscriber unique charging differentiation, a more flexible solution was developed by the applicant.

This prior art solution of flexible rating differentiation provided by the applicant as part of a prepaid service is a so called Family and Friends (FaF) list. This list is not tied to the whole group of subscribers but is instead associated with an individual account or subscriber. FaF is a feature that gives the prepaid operator the possibility to offer number list based tariff differentiation for all types of calls from or to a prepaid subscriber. An example is a lower tariff to a limited number of friends or family members.

The Family and Friends uses lists designed for this feature only and the number type to check (called party number) is hard coded in the service logic. The FaF lists gives the operator the possibility to use FaF for single accounts and multi-user accounts. From the prepaid system point of view there is no difference between a single user account and a multi-user account relating to the use of the FAF feature.

For a single user account the prepaid system uses the FaF number lists associated with the subscriber and/or the account to store the FaF numbers for the prepaid subscriber.

For a multi-user account the number list for an account can be used as a master FaF number list for all prepaid subscribers connected to the account. Each subscriber connected to the account can also have an individual FaF number list.

At call set-up for a single or multi-user account, the FaF number list connected to the subscriber is checked first. If the called party number is not found in the subscriber's FaF list and a FaF number list connected to the account exists, this number list for the account is then checked. If the called number is found the FaF indicator stored for that number in the list will be used. Thus, the check for a hit in the list is made before entering the rating structure. For each number in the list it is possible to store an indicator which is used as branching condition to be able to have different tariffs for different numbers in the list.

A FaF number list stores number series or full numbers to any subscriber and a FaF indicator for every number or number series in the list. Further, a FaF indicator must always be set for a number or number series in the FaF number list. The FaF number lists are checked with priority. This means that the subscriber's FaF number list is checked first and the account FaF number list after this.

The FaF indicator is used for charging purposes in the tariff structure. All indicators can have its own branching condition and corresponding tariff in the tariff structure.

Charging for FaF takes place in the tariff when a FaF condition exists in the tariff. The condition will branch on the FaF indicator value. The FaF condition works together with the nodes and tariffs in the tariff tree.

Thus, the FaF feature is a pre-processing step before the actual rating and not an integrated part of the latter. The output from this pre-processing is one, and only one, list indicator.

In some charging systems it is desirable to make further flexible rating differentiation and to support new features based on subscriber/account unique data differentiation without having to upgrade the system. It is also desirable to be able to introduce new charging models within a short time frame.

The rating structure or rating plan is the price list for services and is changeable by the operator. In prior art system the FaF list is checked as part of the charging or service logic before entering the rating plan. Thus, the FaF lists are defined for this feature only and the number type to check (called party number) is hard coded in the service/charging logic. Due to this it is not possible for a further operator-defined differentiation. Moreover, it is a problem to be able to support new features based on subscriber/account unique data differentiation without having to upgrade the system.

SUMMARY OF THE INVENTION

It is an object of the present invention to provide an improved method for flexible rating differentiation of service usage in a communications system depending on data unique per subscriber, account or groups of subscribers and accounts.

This object is achieved by a method for determining rating data for services in a communications network, wherein an incoming charging request is received from a service element, data associated with a service or a subscriber is accessed, and a tariff structure is analysed. The method is characterised by the steps of, if there is a condition in the tariff structure for said data, checking if at least a fraction of the data is included in any list or record associated with a subscriber, account, subscriber group, or account group, continuing to analyse the tariff structure based on the result if the checking for finding a resulting tariff for return to said request.

A more specific object of the invention is to provide an improved data processing system and a computer program for working the method.

An advantage of the present invention is that it is possible to store different kinds of numbers or other types of data that could be used for rating differentiation, like for example location numbers.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

In order to explain the invention in more detail and the advantages and features of the invention, a preferred embodiment will be described in detail below, reference being made to the accompanying drawings, in which.

DETAILED DESCRIPTION OF THE INVENTION

Figure 1:
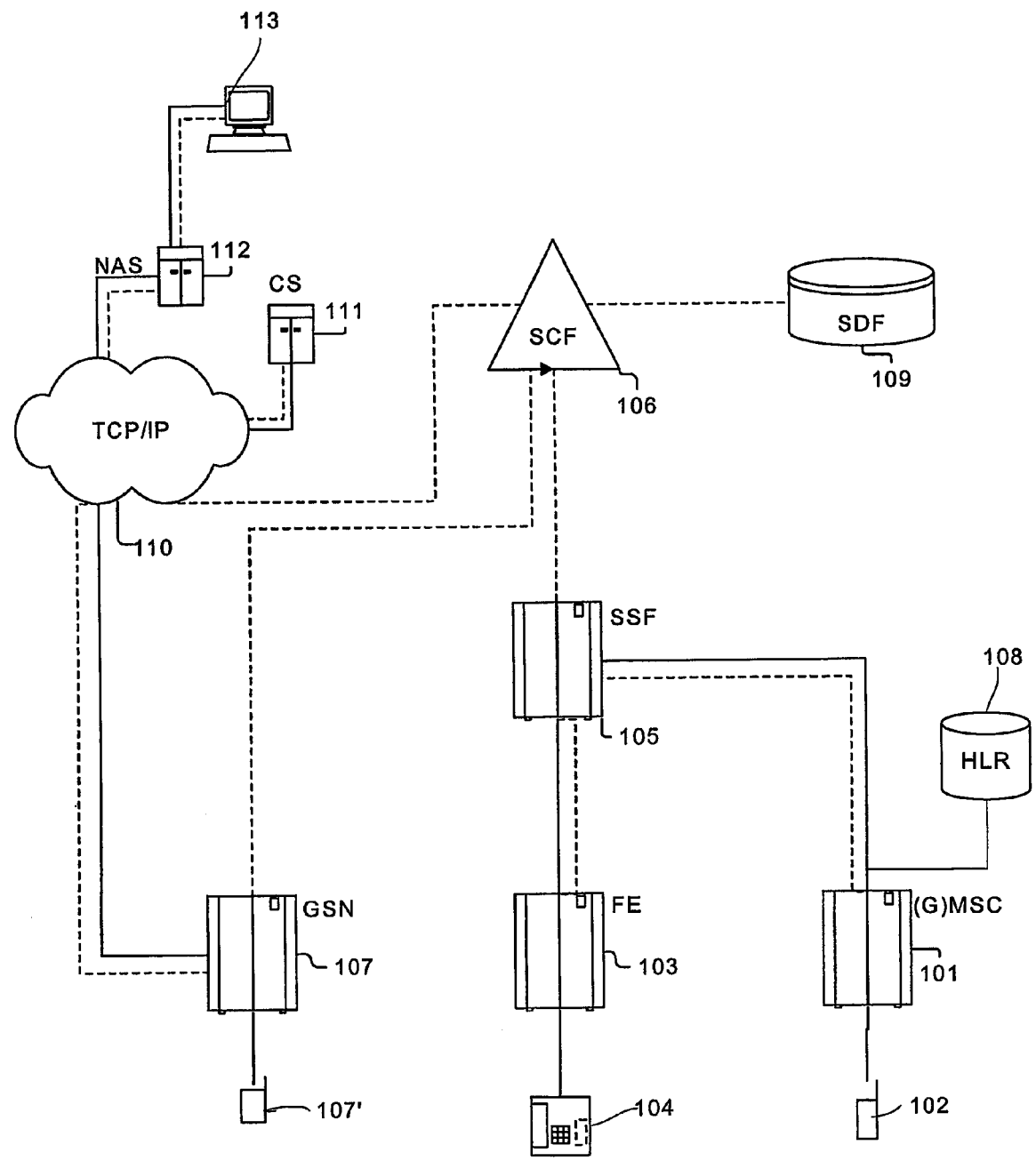
FIG. 1 is a schematic view of a part of a cellular mobile telephone network.

Referring to FIG. 1, there is shown an example of a communications network such as a cellular mobile telephone network or PLMN (public land mobile network) including a service providing network, such as an intelligent network (IN) facilitating service delivery for subscribers connected to the network. In this embodiment, the network also provides a real-time charging mechanism and a method for determining rating data for pre-paid services for subscribers in the communications network. The real-time charging mechanism is only one example of a method for charging for services in a communications network, but this mechanism is not necessary for the invention. This real time charging mechanism supports rating and charging of both prepaid and post paid services. An off-line mechanism or other method of charging is likewise possible within the scope of the invention.

Cellular telephone service, such as GSM/UMTS, involves the subdivision of a service area into a number of smaller cells. Among other components and features, a cellular mobile communications system or PLMN comprises a gateway mobile services switching centre (GMSC) 101 and mobile services switching centre (MSC), which provides specific data about individual mobile phones 102 in the network and operates as an interface towards other networks such as other PLMNs, ISDN or a public switched network (PSTN), represented by a fixed exchange 103 and telephone set 104 in the communications system. The (G)MSC 101 comprises a data processing system, including a computer processor for processing data, and storage means connected to the computer processor for storing data on a storage medium.

Cellular systems are using radio access based on both analogue and digital transmission. Digital cellular systems provide the best quality with the least amount of band-width. Different kinds of principles such as TDMA or CDMA technologies are used for digital cellular systems, such as GSM.

The communications system also has an intelligent network IN with a signalling network, which performs message switching between network elements. In this embodiment of the invention, a specific type of signalling protocol, signalling system 7 (SS7), is used as a carrier for the exchange of information messages and carries many types of information elements, which are useful for intelligent network services. However, SS7 is only an example and the signalling protocol can be based on another protocol such as the Internet Protocol (IP), Camel Application Part (CAP) for GSM/UMTS, IN Application Part (INAP) for fixed networks—where CAP and INAP are transported on SS7/C7/SIGTRAN. Additionally, the intelligent network includes a service switching function 105, a gsm service switching function (gsmSSF) in this embodiment. The SSF 105 is in GSM usually located in the (G)MSC 101. The SSF 105 detects events indicating a call requiring IN and after this triggering, it suspends call processing and starts a series of transactions with a service control function 106, a gsm service control function (gsmSCF) in this embodiment. Additionally or as an alternative, the communications system has a service or gateway GPRS support node 107, including a gprs service switching function (gprsSSF), for communication with users of GPRS equipment 107'.

The SCF 106 is a real-time service processing system that, based on a query from the SSF 105, performs subscriber- or application-specific service logic, controlling the call set-up and call flow. A home location register (HLR) 108 stores the identity and user data of all the subscribers belonging to the PLMN. Further, the HLR 108 provides the (G)MSC 101 with the necessary subscriber data when a call is coming from a public switched network (PSTN) 103,104, an ISDN network, the Internet etc. A visitors location register (VLR) of the (G)MSC 101 contains relevant data of all mobiles currently located or roaming within a serving (G)MSC 101. The VLR has to support the (G)MSC 101 during call establishment when a call is coming from a mobile telephone 102.

A service data function (SDF) 109 or point is a database containing service data needed for the service, including for example tariff data, subscriber data, group data etc. In this embodiment, the SDF 109 or SCF 106 also handles rating and charging analysis.

The disclosed embodiment of the communications system according to the invention also includes a TCP/IP network (Internet) 110, a content server (CS) 111 and at least a network access server 112 for communication with computer terminals 113 and their users.

Before a mobile telephone user can make a phone call or use other post or prepaid services provided by the network and service providers, content provider or value added service provider etc., hereafter called providers, he/she has to be registered as a "subscriber".

As mentioned above, the database of the service data function (SDF) 109 contains service data needed for services, including for example tariff data, subscriber data, group data etc in this embodiment.

Figure 2:
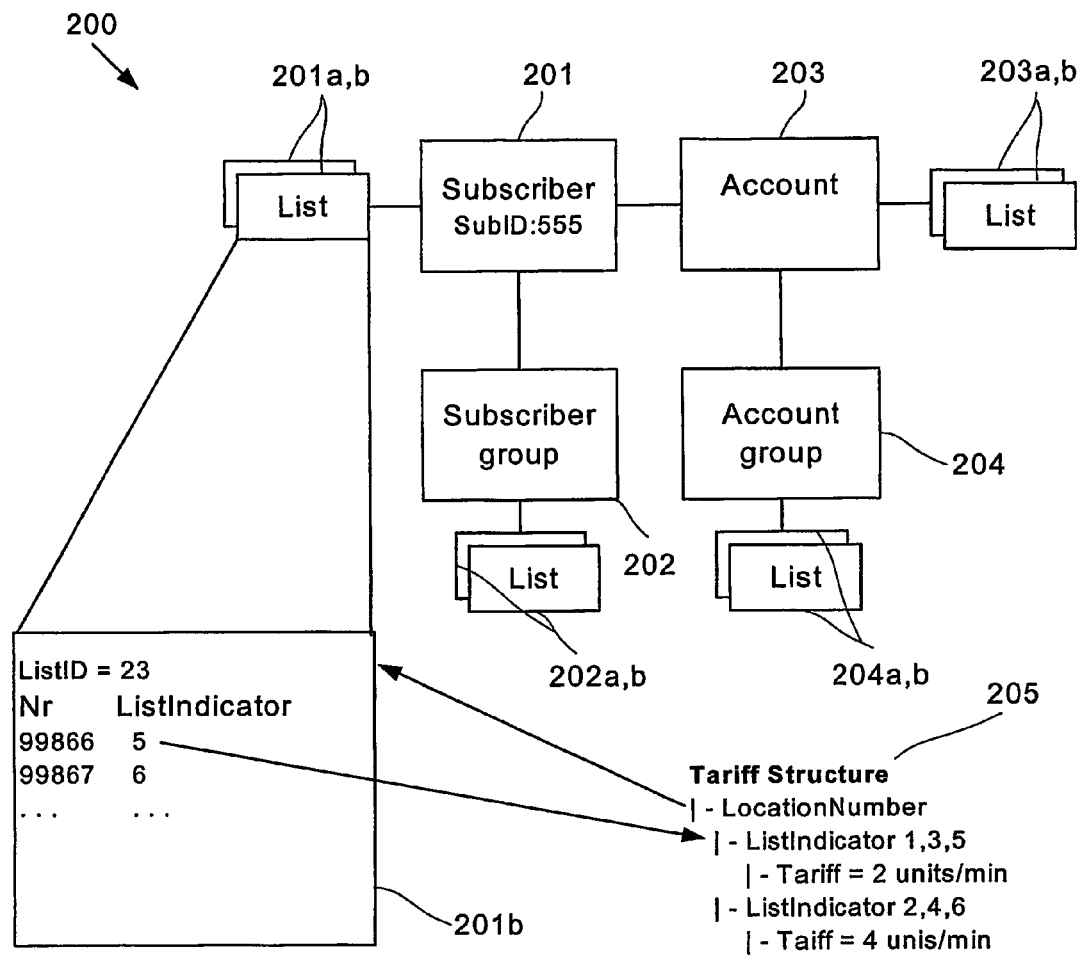
FIG. 2 is a block diagram of a data structure 200 forming a part of the charging system for flexible rating differentiation according to the invention.

One embodiment of a data structure 200 forming a part of the charging system for flexible rating differentiation according to the invention is shown in FIG. 2. The data structure is stored and handled by the SDF 109 (and SCF 106) shown in FIG. 2 and includes data and information for flexible rating differentiation of service usage in a communications system depending on data unique per subscriber, account or groups of subscribers and accounts.

A subscriber is identified by a subscriber ID (SubID) 201, for example MSISDN in GSM. The SubID 201 is associated with a subscriber group 202 and one or more accounts 203. The account is in turn associated with an account group 203.

Depending on one or more parameters, such as the particular subscription of the subscriber or services accessible by the user, one or more lists 201*a-b*, 202*a-b* 203*a-b*, and 204*a-b*, capable of storing any kind of number or any kind of information type like objects, strings or byte string etc, are created and associated with at least any of the objects: SubID 201, subscriber group 202, i.e group of subscribers, account 203, or account group 204, i.e group of accounts. Each object 201-204 in FIG. 2 has two associated lists for the purpose of illustration, but in other alternative embodiments or configurations some of the objects have more than two associated lists and some of them have only one or even no associated list.

The term list is used herein as a conceptual denomination but the actual implementation may vary. Normally, a simple table would be used but other data structures as linked lists, trees etc. could be used as well. With further reference to FIG. 2, a list 201*b* associated with the subscriber object is created with a ListId=23 and a Description=HomeZone. The Description=HomeZone is added to provide the operator with information about the intended use of the list, but is only used as a description field which means that the list could be used for other purposes as well. The list is instantiated for the subscriber with SubId=555 and filled with two entries, each consisting of a list item and a list indicator. In this example the list items are location numbers: [99866;5] and [99867;6]. However, in alternative embodiments the list items can be other kind of location data such as, cell identity, longitude/latitude position etc or an internet address such as an email address, ip-address, SIP address etc.

Another subscriber, account, account group or subscriber group can create their own instance of the list 201*b* with the same ListID=23. Herein, own instance means a new object with its own content but being of the same type and use the same listID.

A part of the overall rating or tariff structure 205 shown in FIG. 2 includes a branching condition to check if the location number received in the rating request is part of the List 201*b* with the ListID=23. If the List-Indicator stored together with the number in the list is 1, 3 or 5, a tariff of 2 units/min will be applied.

The following pseudo code illustrates a part of the tariff structure 205:

|-LocationNumber in list 23
   |-ListIndicator 1, 3, 5
      |-Tariff=2 units/min All objects can have their own instance and also own content of a list, but the identifier (ListID) of the list is the same for every object associated with an instance of that list. As an example, all subscribers' list defining their respective HomeZone location numbers would be designated the listID 23. Which number or type of information to check is part of the rating structure as a branching condition. One reason for this is that it is not possible to know in advance what to check against the list content. It is depending on the traffic case and other types of branching conditions if a check towards a list is to be performed. Thus, it is not possible to perform this until the tariff tree is traversed.

Hence it is also possible to perform a check of different information towards the same list type e.g. Location Number or CalledPartyNumber.

Moreover, if several different lists are stored for a subscriber it can be wasted time to go through all lists before entering the rating structure and before it is known if this traffic case has a branching on the list content.

The method for flexible rating differentiation of service usage in a communications system depending on data unique per subscriber, account or groups of subscribers and accounts, is illustrated by the flowcharts in FIG. 3 and FIGS. 3A-3C.

A subscriber 102 with a SubID:555 makes a call from a cell with a location number 998661234 and based on a charging request from a service element the charging and rating function in the SDF 109 collects or accesses charging input parameters or data such as: service data, subscriber related data, session data, call data, system data etc, received as parameters from a service element for a service requested by a subscriber, in step 301. One example of a requested service is a regular phone call from a pre-pay subscriber 102 in a PLMN. The subscriber 102 has an account 203 registered for one or more services. The service element is for example an SCF 106 via CAP or INAP, HLR 108 via MAP, web servers/application servers 111 via Diameter, SIP, open API via IP, i.e OSA/Parlay, XML web services via SOAP or any other server with an application requiring charging support, such as an e-commerce site movie/music server for streaming, a news site, WAP server or an SMSC/MMS-C, in alternative embodiments. The charging system receives charging input parameters such as an article, number of events, kind of event, service, local time, destination number, originating or terminating location, distance, QoS, number of time slots, or utilised capacity etc.

Figure 3:
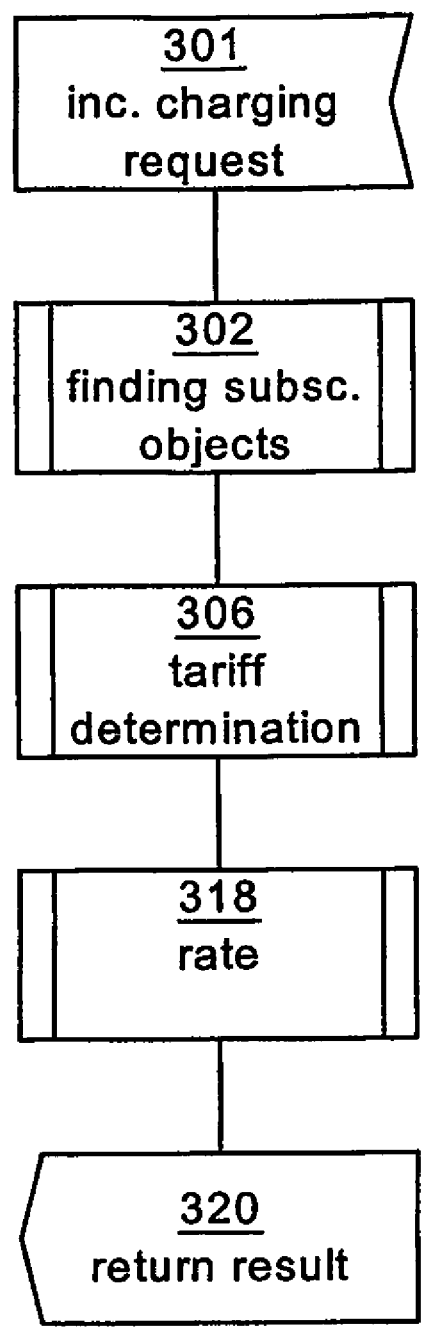
FIG. 3 is a flowchart of the method for flexible rating differentiation according to the invention.
Figure 3A:
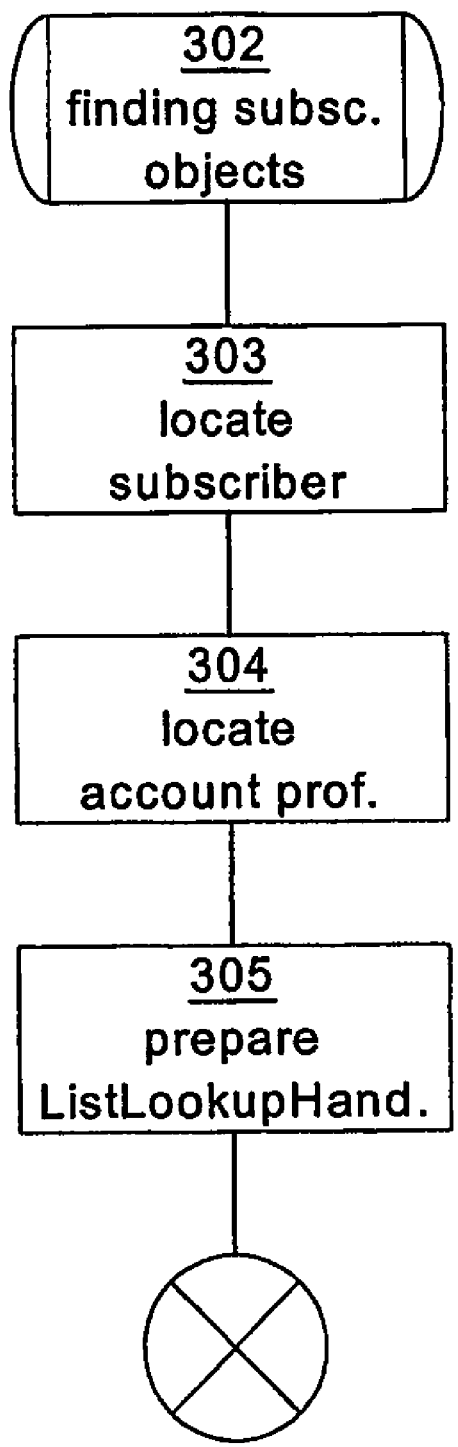
FIGS. 3A-3C is flowcharts of the method for flexible rating differentiation according to the invention in further detail.
Figure 3B:
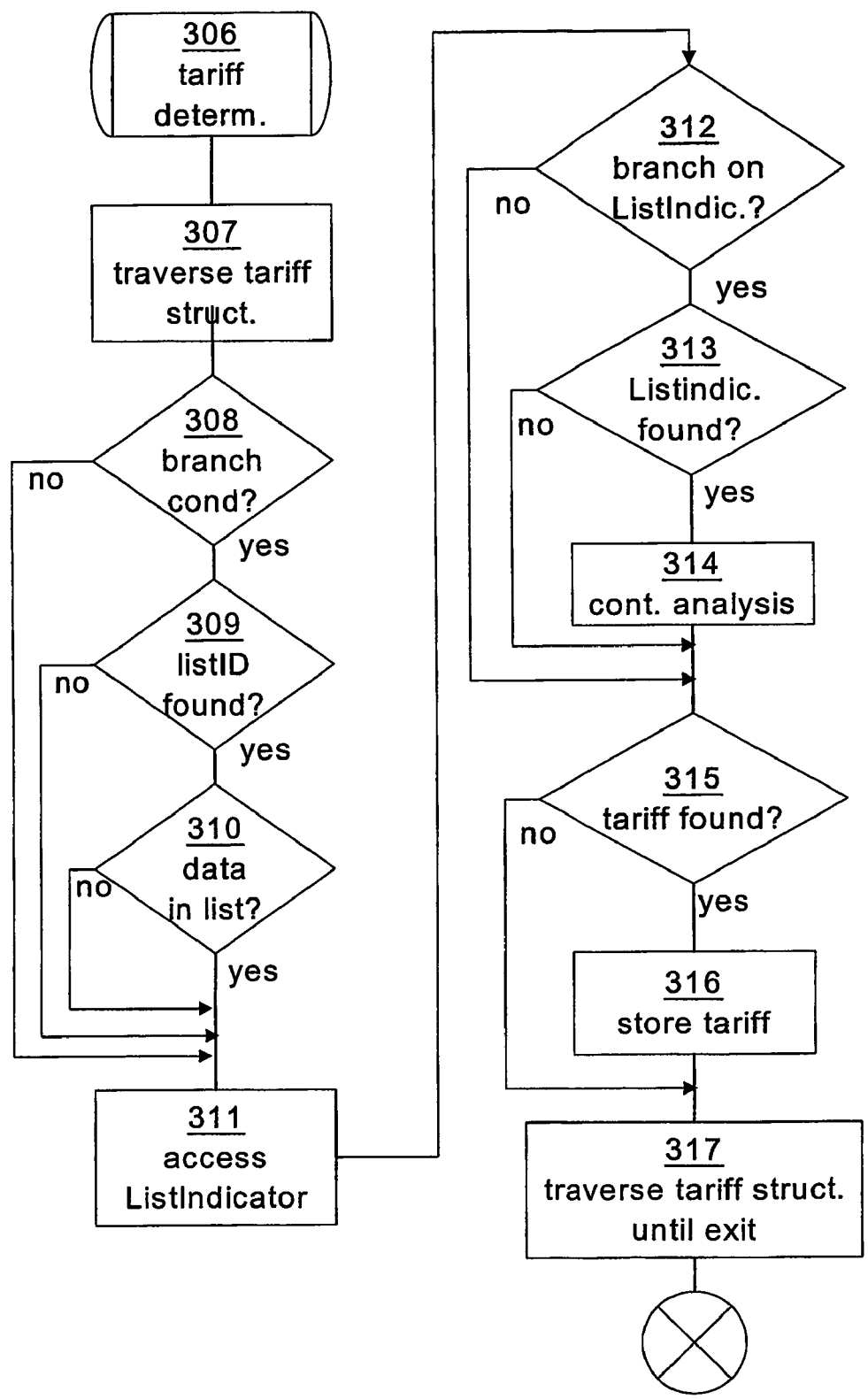
Figure 3C:
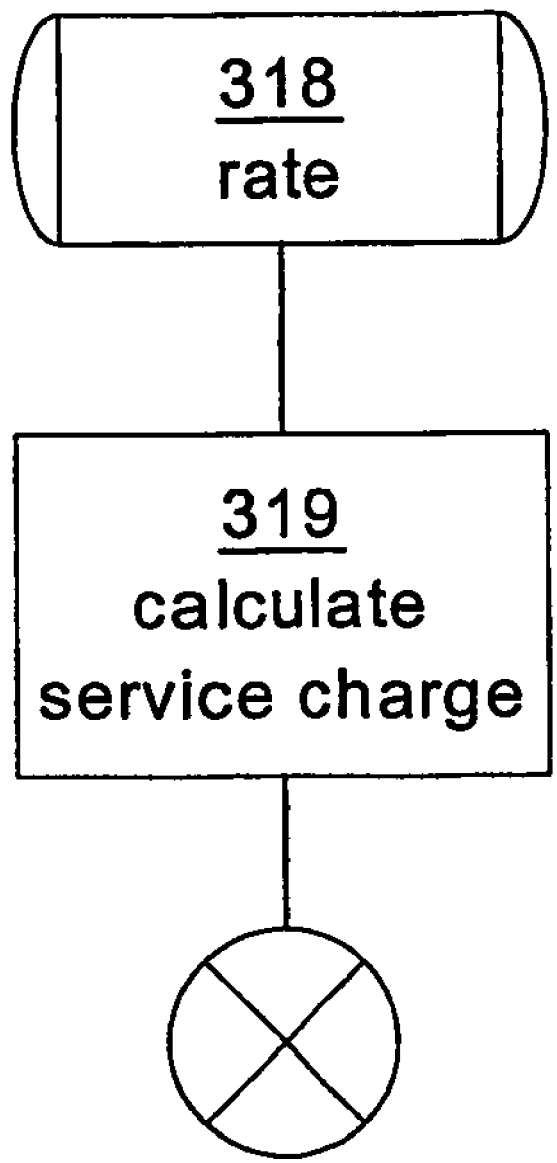

In step 302 the method starts to find objects associated with the SubID and proceeds to the sub routine in FIG. 3A. The subscriber and its references to the subscriber group 202 and its account 203 are located in the database of the SDF 109 in step 303. The account group 204 is located via the account 203 associated with the subscriber 201 in step 304.

Before entering the rating structure a list handler is instantiated in the SDF 109 with references to the different objects: subscriber 201, subscriber group 202, account 203, account group 204 and the List-Id that is stored for each object. The list handler is a software module in the system adapted to give fast access to the different objects for making the list lookup more efficient. The list handler is however not necessary for the operation of the method and system according to the invention.

The next procedure or set of method steps, i.e the tariff determination, constitutes the main part of the method according to the invention. This part is entered through FIG. 3B step 306 and proceeds by traversing the tariff structure in step 307. A decision is made whether there is a branching condition for the location number or not in step 308. A branching condition contains what to check and which list to check against. In this example there is a branching condition to check the LocationNumber against ListID:23 in step 309. The used location number (998661234) is sent to the list handler to check if any object contains this location number in step 310. The search starts going through the list content for the subscriber. When the specified branching parameter to check for, here location number, is found in the list a list indicator is returned to the tariff structure and can be used as a further branching condition. The list indicator is used to be able to have different tariffs for different items (e.g. numbers) in the list. Thus, when a match is found, the List indicator 5 is returned from the list handler and is accessed in step 311, in this embodiment. If no match has been found on the subscriber 201, and if the same list is instantiated on several objects the objects will be checked in a certain priority order, e.g. 1. subscriber 201, 2. account 203, 3. subscriber group 202, and 4. account group 204.

The rating method proceeds with a check if there is a branch condition for a list indicator in step 312 and if so it proceeds to find the current list indicator 5 in the tariff structure in step 313. The analysis of the tariff structure is continued under this condition in step 314. The structure shown in FIG. 2 results in a tariff of 2 units/min for the list indicator 5 in step 314. The tariff is stored in step 316. The method proceeds through the rest of the tariff structure until an exit criteria is found in step 317.

Again referring to FIG. 3, the rate is initiated in step 318. Based on the received input parameters and the determined tariff, 2 units/min in this embodiment, the actual cost or charge of the used service is calculated in step 319, which is illustrated by the procedure in FIG. 3C.

The calculated charge is finally returned to the requesting service element, i.e the SCF 106 in this embodiment but could also be for example a content server 111.

The operator controls main rating schemes and central tariff data stored in the database of the SDF 109. The operator also keeps account data for subscribers. Additionally, the operator provides means for call control and, might contain authentication and authorisation functions of the end-user.

The method of the present invention is preferably implemented in computer software executable preferably by a central or distributed data processing system forming part of the overall communication system. More specifically, the operator form a separate data processing system or is a subsystem of the overall communication system for communication with other devices, components or data processing system/s in the communications system of the network or networks. In one embodiment of the data processing system, i.e the SCF 106, according to the invention it comprises a computer processor for processing data in the operator, and at least a storage connected to the computer processor for storing data, such as the database of the SDF 109, on a storage medium. In this embodiment of the invention, the computer processor of the operator in the network is configured to work the steps of the method.

Hence, it should be apparent that the present invention provides an improved method and system for use in an electronic communications system or network, comprising a rating and charging mechanism that provides an improved charging system for flexible rating differentiation of service usage in a communications system depending on data unique per subscriber, account or groups of subscribers and accounts, that fully satisfies the aims and advantages set forth above. Although the invention has been described in conjunction with specific embodiments thereof this invention is susceptible of embodiments in different forms, with the understanding that the present disclosure is to be considered as an exemplification of the principles of the invention and is not intended to limit the invention to the specific embodiments illustrated.

In an alternative embodiment of the method and system according to the invention, it will be possible to check for exact match of item or just part of the item (like number series or wild cards). The reason for this is that for example with Family and Friends numbers it should not be possible to store number series (e.g. to get discount for all numbers beginning with +46). But for example with location numbers it should be possible to check against number series. Exact match or wildcards are also possible to use when the lists contains strings or byte strings.

This solution can for example be used to implement features like family and friends, and home zone based charging. In the latter case the solution is to store location numbers for the home area of a subscriber in a list tied to a subscriber. It would also be possible to create a group for a certain city, such as a "Stockholm Group" where all Stockholm subscribers has a certain discount when calling from Stockholm. In this case the List tied to the Subscriber Group contains the location number(s) for Stockholm. Another example is to differentiate charging for content provided by different content providers where the provider string is used as items in the list. In general it is interesting to be able to differ charges uniquely per subscriber/account based on things like friends/relatives email addresses, certain sent/received messages or any used services made possible by UMTS.

Although the method is described in conjunction with a mobile telephone call in an intelligent/CAMEL network of a mobile communications system, such as GSM, the method is applicable on any communication session, both terminating and originating, and other communication services in other kind of networks. For example, the method and system according to the invention are applicable in other mobile telephone networks, public switched telecommunications networks (PSTN), ISDN, ATM, Internet etc., which provide many different more or less sophisticated tele and data communications services for users and providers.

The invention claimed is:

1. A computer program embodied in a computer-readable medium, comprising program code means for causing a computer to perform the following steps:
   determining rating data for services in a communications network including:
      receiving an incoming charging request from a service element for a prepared communication service requested by a subscriber,
      accessing data associated with the service or the subscriber, and
      analyzing a tariff structure associated with the requested communication service;
   if there is a condition in said tariff structure for said rating data, checking if at least a fraction of said rating data is included in any list associated with a subscriber, account, subscriber group, or account group, by accessing a memory storing said at least one list;

continuing to analyze the tariff structure based on the result of said checking to determine a resulting tariff; and returning said resulting tariff to said request.

2. A computer program according to claim 1, wherein the step of checking if data is included in any list includes accessing a list indicator corresponding to said data in the list and determining whether there is a branching condition for said list indicator in the tariff structure.

3. A computer program according to claim 1, wherein said data is a location data.

4. A computer program according to claim 1, wherein said data is an internet address.

5. A computer program according to claim 1, wherein the step of checking includes checking in a certain priority order if the same list is instantiated on several objects.

6. A computer program according to claim 5, wherein the priority order is existing lists associated with: the subscriber, the account, the subscriber group, and the account group.

7. A computer program according to claim 1, wherein the charging request includes charging input parameters or data such as: service data, subscriber related data, session data, call data, or system data.

8. A computer program according to according to claim 1 forming a product comprising program code means stored on a computer readable medium.

9. A computer system for use in a communications system comprising:
means for receiving an incoming charging request from a service element;
means for accessing data associated with a service or a subscriber,
means for analyzing a tariff structure associated with the requested communication service,
means, if there is a condition in said tariff structure for said rating data, for performing a check if any list or record associated with a subscriber, account, subscriber group, or account group contains said rating data, by accessing a memory storing said at least one list,
means for continuing to analyze the tariff structure based on said list indicator for determining a resulting tariff, and
means for returning said resulting tariff to said request.

10. A computer system according to claim 9, further comprising:
means for accessing a list indicator corresponding to said rating data, and
means for determining whether there is a condition for said list indicator, and if so, for finding the current list indicator in the tariff structure.

11. A computer system according to claim 9, wherein said rating data is a location number.

12. A computer system according to claim 9, wherein said rating data is an internet address.

13. A computer system according to claim 9, wherein said system is an SDF or an SCF in a cellular communications system.

14. A computer system for use in a communications system comprising electronic circuitry configured to perform the following tasks:
receive an incoming charging request from a service element;
access data associated with a service or a subscriber,
analyze a tariff structure associated with the requested communication service,
if there is a condition in said tariff structure for said rating data, perform a check if any list or record associated with a subscriber, account, subscriber group, or account group contains said rating data, by accessing a memory storing said at least one list,
continue to analyze the tariff structure based on said list indicator for determining a resulting tariff, and
return said resulting tariff to said request.

15. A computer system according to claim 14, wherein the electronic circuitry is further configured to:
access a list indicator corresponding to said rating data, and
determine whether there is a condition for said list indicator, and if so, for finding the current list indicator in the tariff structure.

16. A computer system according to claim 14, wherein said rating data is a location number or an internet address.

17. A method for use in in a communications system comprising:
receiving an incoming charging request from a service element;
accessing data associated with a service or a subscriber,
analyzing a tariff structure associated with the requested communication service,
if there is a condition in said tariff structure for said rating data, performing a check if any list or record associated with a subscriber, account, subscriber group, or account group contains said rating data, by accessing a memory storing said at least one list,
continuing to analyze the tariff structure based on said list indicator for determining a resulting tariff, and
returning said resulting tariff to said request.

18. The method according to claim 17, wherein the electronic circuitry is further configured to:
accessing a list indicator corresponding to said rating data, and
determining whether there is a condition for said list indicator, and if so, for finding the current list indicator in the tariff structure.

19. The method according to claim 17, wherein said rating data is a location number or an internet address.

* * * * *